(No Model.) 3 Sheets—Sheet 1.

G. B. RAIT.
LOCOMOTIVE HEADLIGHT.

No. 588,878. Patented Aug. 24, 1897.

Witnesses
Inventor
George B. Rait
by H. B. Wilson
Attorney (No Model.) 3 Sheets—Sheet 2.
G. B. RAIT.
LOCOMOTIVE HEADLIGHT.
No. 588,878. Patented Aug. 24, 1897.
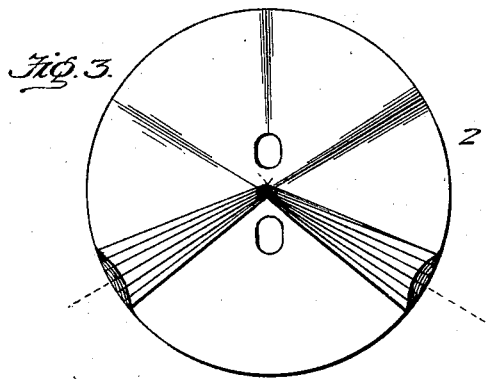
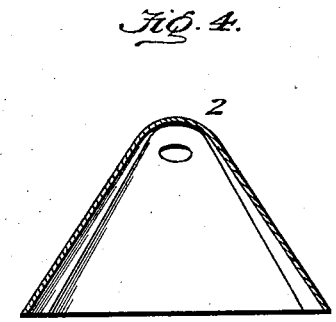
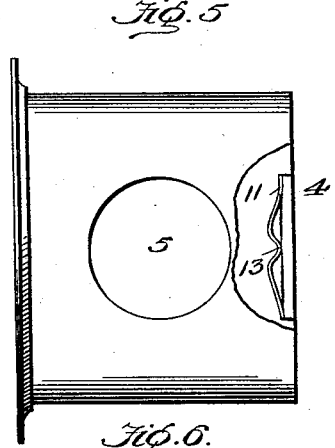
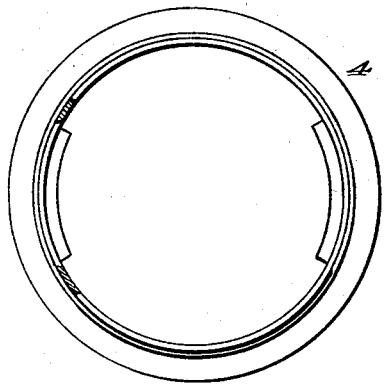

(No Model.)  3 Sheets—Sheet 3.
G. B. RAIT.
LOCOMOTIVE HEADLIGHT.
No. 588,878.  Patented Aug. 24, 1897.
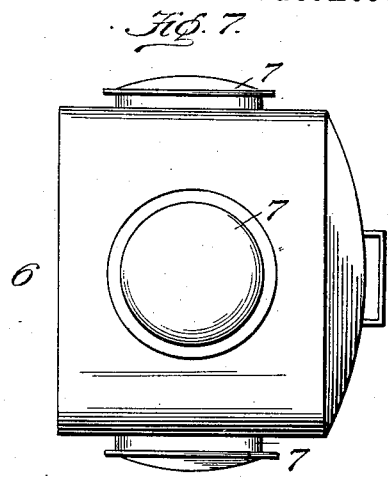
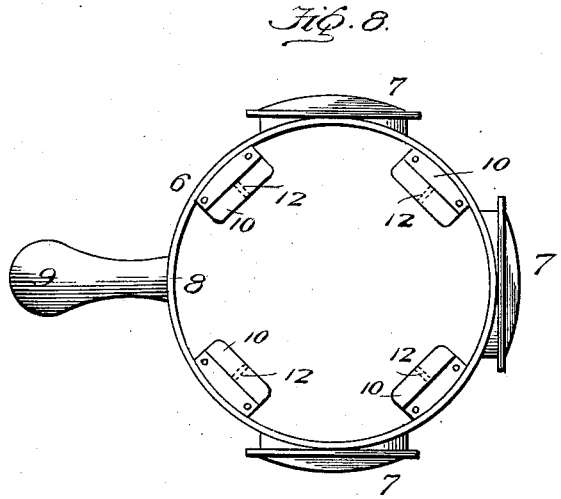
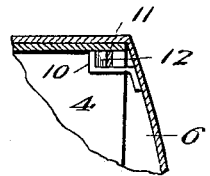
Witnesses  Inventor
George B. Rait
by H. B. Wilson
Attorney

UNITED STATES PATENT OFFICE.

GEORGE B. RAIT, OF BOYDEN, IOWA, ASSIGNOR TO KATHERINE F. RAIT, OF SAME PLACE.

LOCOMOTIVE-HEADLIGHT.

SPECIFICATION forming part of Letters Patent No. 588,878, dated August 24, 1897.

Application filed April 9, 1897. Serial No. 631,438. (No model.)

*To all whom it may concern:*

Be it known that I, GEORGE B. RAIT, a citizen of the United States, residing at Boyden, in the county of Sioux and State of Iowa, have invented certain new and useful Improvements in Locomotive-Headlights; and I do declare the following to be a full, clear, and exact description of the invention, such as will enable others skilled in the art to which it appertains to make and use the same.

My invention relates to locomotive-headlights; and the object of the same is to combine with a locomotive-headlight the colored signal-lights, thereby saving the expense of separate small signal-lights and the oil to supply the same.

With this object in view the invention consists of certain features of construction and combination of parts, which will be hereinafter fully set forth and claimed.

Figure 1:
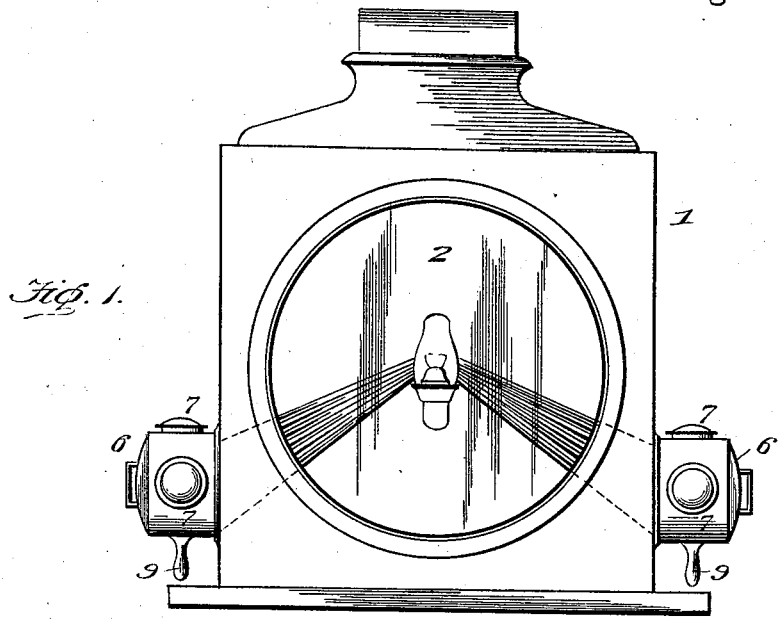
Figure 2:
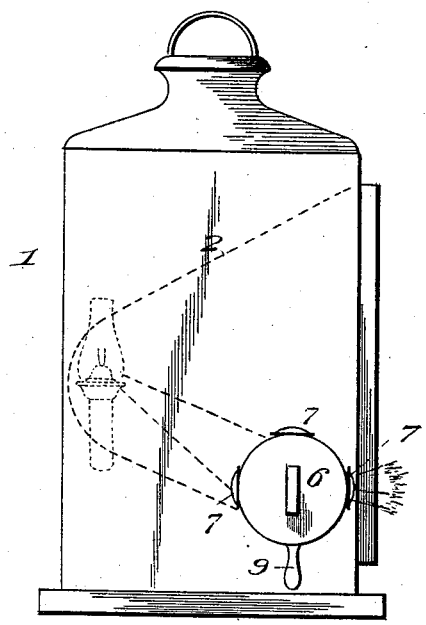

In the accompanying drawings, Figure 1 is a front view of a locomotive-headlight box embodying my invention. Fig. 2 is a side view of the same. Fig. 3 is a plan view of my improved reflector. Fig. 4 is a sectional view through the same. Fig. 5 is a side view of one of the side-light sleeves. Fig. 6 is an end view of the same. Fig. 7 is a side view of one of the side-light-lens holders. Fig. 8 is an end view of the same, looking into the interior thereof; and Fig. 9 is a detail view of the improved catch.

In the drawings, 1 denotes a headlight-box, which may be of any well-known or approved construction.

2 denotes the reflector, provided with two radial corrugations which are at the rear of the lamp 3 and which increase in breadth from the center of the reflector toward the edge thereof and lead to laterally-projecting sleeves 4, secured to the lower quarters of the box, so as to direct the rays of light therein. Each of these sleeves has its inner surfaces provided with some reflecting substance, and the forward side of each sleeve is provided with an opening 5.

6 denotes the signal-lens holder, which consists of a band which encircles said sleeves and is provided around its periphery with lenses 7 of different colors and with a blank 8. Each of these lens-holders is provided with an operating-handle 9 and also with catches 10 to engage the springs 11 on the sleeves, by means of which they are held in place.

In operation if it is desired to display a red light the handle is grasped and the lens-holder turned until the red lens is presented in front of the opening in the sleeves, and the lights will be thrown from said sleeve outwardly through the red lens.

Should it be desired to give a green signal or a white signal, the green or white lens is brought in front of the opening in the sleeve and secured in that position by the catches. Should it be desired to give no signal at all, then the lens-holder is turned until the blank portion is brought opposite the opening in the sleeve.

The catches 10, of which there are four fixed at equidistant points on the lens-holder, are each formed with a central retaining-rib 12, which engages a detent 13 in the spring 11, two of which are fixed at equidistant points on the sleeve, so that by slipping the lens-holder over the sleeve and giving it an eighth of a revolution the catches may engage the springs and secure the holder in place.

From the above description, taken in connection with the accompanying drawings, the operation and advantages of the invention will be readily understood without requiring further explanation. By this construction a great saving is made, in that the separate signal-lights heretofore employed are entirely dispensed with and the oil used to supply the lights is saved.

Although I have described my invention as being used in connection with locomotive-headlights, I would have it distinctly understood that I contemplate employing my invention in connection with lights for vessels or, in fact, with lights wherein any desired signals are made, and therefore do not wish to be restricted to the use of my invention in connection with a locomotive-headlight.

Having thus described my invention, what I claim, and desire to secure by Letters Patent, is—

1. The combination with a headlight-box having a reflector provided with two radial corrugations, sleeves secured to the sides of said box to which the corrugations lead, and provided with openings in their front sides, lens-holders mounted upon said sleeves and provided with means for turning the different lenses in front of the openings therein and holding them locked in that position, substantially as set forth.

2. The combination with a headlight-box, of sleeves secured to the sides thereof in position to receive the rays of light from the reflector of a headlight, and provided with openings in front of the same, a lens-holder consisting of a band provided with a series of different-colored lenses and with a blank, and means by which the lens-holder may be adjusted to bring the blank or either of the lenses opposite the opening in the sleeves, substantially as set forth.

3. The combination with the headlight-box provided with the sleeves 4, having the fixed springs 11 formed with a detent 13, of the removable lens-holder 6 provided with the fixed catches 10 formed with a central retaining-rib 12, substantially as set forth.

In testimony whereof I hereunto affix my signature in presence of two witnesses.

GEORGE B. RAIT.

Witnesses:
S. HANY,
C. KOOYMAN.